United States Patent [19]

Chao

[11] Patent Number: 5,313,639

[45] Date of Patent: May 17, 1994

[54] COMPUTER WITH SECURITY DEVICE FOR CONTROLLING ACCESS THERETO

[76] Inventor: George Chao, No. 21-1, Lane 137, Sec. 2, Chung-Shan N. Rd., Taipei City, Taiwan

[21] Appl. No.: 904,563

[22] Filed: Jun. 26, 1992

[51] Int. Cl.[5] .................... G06F 13/14; H04L 9/32
[52] U.S. Cl. ........................ 395/725; 380/25; 340/825.31; 364/231; 364/286.4; 364/286.5; 364/234; 364/DIG. 1
[58] Field of Search ............... 395/725, 325, 650, 575; 235/375, 380, 382; 380/4, 23, 25, 49; 340/825.31, 825.34

[56] References Cited

U.S. PATENT DOCUMENTS

| 4,295,039 | 10/1981 | Stuckert | 235/380 |
|---|---|---|---|
| 4,310,720 | 1/1982 | Check, Jr. | 178/22.08 |
| 4,758,718 | 7/1988 | Fujisaki et al. | 235/487 |
| 4,787,027 | 11/1988 | Prugh et al. | 364/200 |
| 4,812,841 | 3/1989 | Chen | 340/825.31 |
| 4,815,032 | 3/1989 | Fujii | 364/900 |
| 4,879,645 | 11/1989 | Tamada et al. | 364/200 |
| 4,970,504 | 11/1990 | Chen | 340/825.31 |
| 5,012,514 | 4/1991 | Renton | 380/4 |
| 5,060,263 | 10/1991 | Bosen et al. | 380/25 |
| 5,097,506 | 3/1992 | Kaiser, Jr. et al. | 380/25 |
| 5,173,940 | 12/1992 | Lantz et al. | 380/25 |

Primary Examiner—Gopal C. Ray
Attorney, Agent, or Firm—Fitzpatrick, Cella, Harper & Scinto

[57] ABSTRACT

A computer has a floppy disk drive provided in one of the spaces for receiving disk drives of the computer, a computer keyboard and a main system board. An access control device includes a casing placed into another one of the spaces for receiving disk drives of the computer, a keypad provided on a front panel of the casing and operated so as to provide an input password, and a control unit provided within the casing and electrically connected to the keypad. The control unit includes a memory unit which contains a desired password, a microprocessor unit which receives the input password from the keypad and which generates an activating signal when the input password tallies with the desired password in the memory unit, and at least one control circuit connected to a respective one of the computer keyboard, the floppy disk drive and the main system board. Each of the control circuits is actuated by the activating signal from the microprocessor unit so as to unlock and enable the respective one of the computer keyboard, the floppy disk drive and the main system board and permit normal operation of the computer.

10 Claims, 3 Drawing Sheets

COMPUTER WITH SECURITY DEVICE FOR CONTROLLING ACCESS THERETO

BACKGROUND OF THE INVENTION

1. Field of the Invention

The present invention relates to a computer, and more particularly to a computer with a push-button control device that prevents the operation of the computer in the absence of a correct input password.

2. Description of the Related Art

Computers are usually provided with a control device that prevents the unauthorized operation of the same. Such control devices are necessary so as to prevent unwarranted access to classified information, to prevent data loss and to prevent the introduction of a computer virus into the computer.

The access control devices of the above type are currently available in two kinds. The first type is a key-operated control device which is usually installed in most computers. A special key is used to activate the control device so as to permit proper operation of the computer. The second type is a card-operated control device which requires the insertion of an access card into a card receiving groove so as to permit proper operation of the computer.

Note that in both types of access control devices, a separate component (such as a key or an access card) is necessary before the access control device can be activated. The computer cannot be operated when the separate component is lost or damaged. Furthermore, the conventional control devices prevent the operation of the computer by disabling the computer keyboard of the latter. Unauthorized use of the computer is still possible by installing a computer mouse.

SUMMARY OF THE INVENTION

Therefore, an objective of the present invention is to provide a computer with a push-button control device which is adapted to be received in a disk drive receiving space of the computer and which can prevent the operation of the computer in the absence of a correct input password.

Another objective of the present invention is to provide a computer with a push-button control device which locks the computer keyboard and disables the floppy disk drive and the main system board of the computer in the absence of a correct input password.

Accordingly, the preferred embodiment of a computer of the present invention has a floppy disk drive provided in one of the disk drive receiving spaces of the computer, a computer keyboard, a computer power supply and a system board with a clock generator circuit and a power on reset circuit. The computer further has a push-button control device which includes: a casing having a front panel and a pair of side panels which cooperatively define a receiving space, said casing being received in another one of the disk drive receiving spaces of the computer; a keypad provided on the front panel and operated so as to provide an input password; and a control unit provided in the receiving space of the casing and being electrically connected to the keypad. The control unit includes: a memory unit containing a desired password; a microprocessor unit receiving the input password from the keypad and generating an activating signal when the input password tallies with the desired password in the memory unit; and at least one control circuit connected to a respective one of the computer keyboard, the floppy disk drive and the main system board and being actuated by the activating signal from the microprocessor unit so as to unlock and enable the respective one of the computer keyboard, the floppy disk drive and the main system board to permit normal operation of the computer. The floppy disk drive is enabled by connecting the computer power supply thereto. The computer keyboard is unlocked by connecting the main system board thereto. Finally, the main system board is enabled by disconnecting the clock generator circuit from the power on reset circuit.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
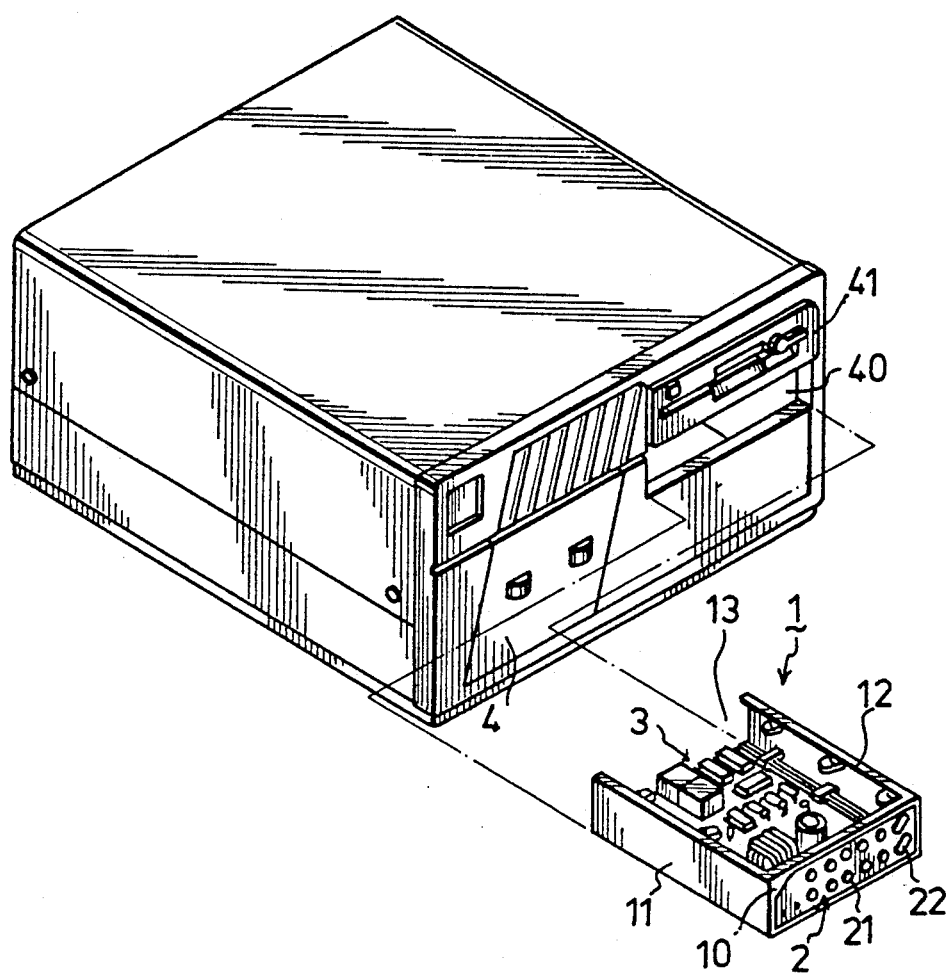
FIG. 1 is an illustration of the preferred embodiment of a computer with a push-button control device according to the present invention.

Referring to FIG. 1, the push-button control device for the computer (4) of the present invention is shown to comprise a casing (1), a keypad (2) and a control unit (3).

The casing (1) has a front panel (10) and a pair of side panels (11, 12) which cooperatively define a receiving space (13). The keypad (2) is provided on the front panel (10) and includes a numeric key set (21) and a function key set (22). The control unit (3) is provided in the receiving space (13) of the casing (1) and is electrically connected to the keypad (2).

The computer (4) has two disk drive receiving spaces (40), although more than two disk drive receiving spaces (40) may be provided therein. The casing (1) is adapted to be received in one of the disk drive receiving spaces (40). Each of the remaining ones of the disk drive receiving spaces (40) receives a floppy disk drive (41).

Figure 2:
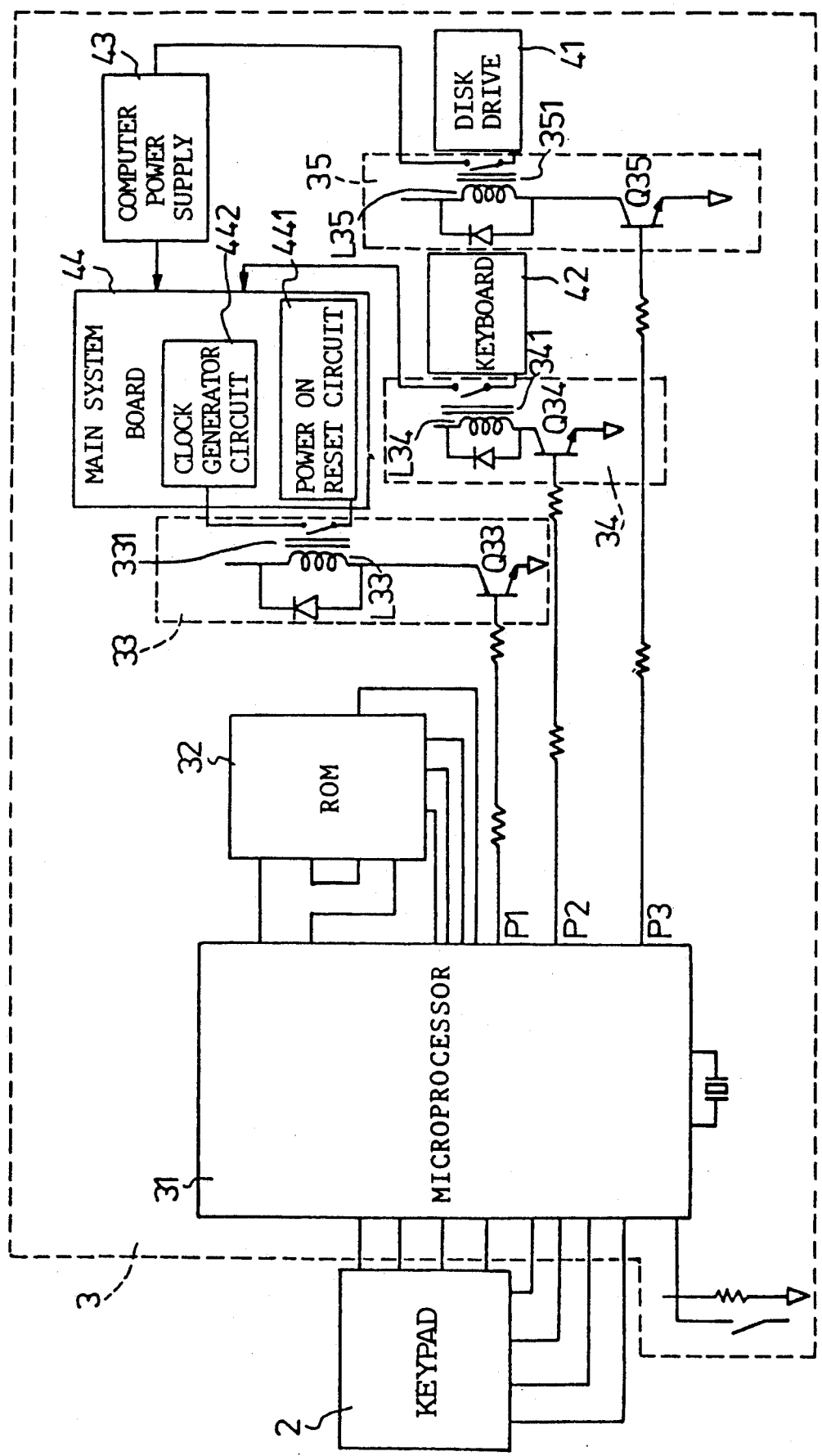
FIG. 2 is a schematic electrical circuit diagram of the preferred embodiment.

Referring to FIG. 2, the control unit (3) comprises a microprocessor unit (31), a read only memory (ROM) unit (32), a keyboard control circuit (34), a main system board control circuit (33) and a disk drive control circuit (35).

The ROM unit (32) is preferably an electronic erasable programmable ROM (EEPROM) and is used to store a desired password. The control unit (3) disconnects the output lines of the computer keyboard (42) from the main system board (44) and the floppy disk drive (41) from the computer power supply (43) and maintains the main system board (44) in a reset state in order to prevent the operation of the computer (4) in the absence of a correct input password.

The keypad (2) is operated so as to provide an input password to the microprocessor unit (31). The microprocessor unit (31) then compares the input password with the desired password which has been previously stored in the ROM unit (32). If both passwords tally, the microprocessor unit (31) generates a high logic signal at the control lines (P1, P2, P3). The control lines (P1, P2, P3) are connected to the switching transistor (Q33, Q34, Q35) of a respective one of the control circuits (33, 34, 35). Each of the control circuits (33, 34, 35) further comprises a relay unit (331, 341, 351) which has a coil (L33, L34, L35) connected to the respective switching transistor (Q33, Q34, Q35). A high logic signal at the control lines (P1, P2, P3) causes the switching transistors (Q33, Q34, Q35) to conduct, thereby energizing the coils (L33, L34, L35) to connect the disk drive (41) to the power supply (43), to connect the output lines of the keyboard (42), and the main system board (44), and to disconnect a power on reset circuit (441) of the main system board (44) from a clock generator circuit (442) of the same. This permits normal operation of the computer (4).

Figure 3:
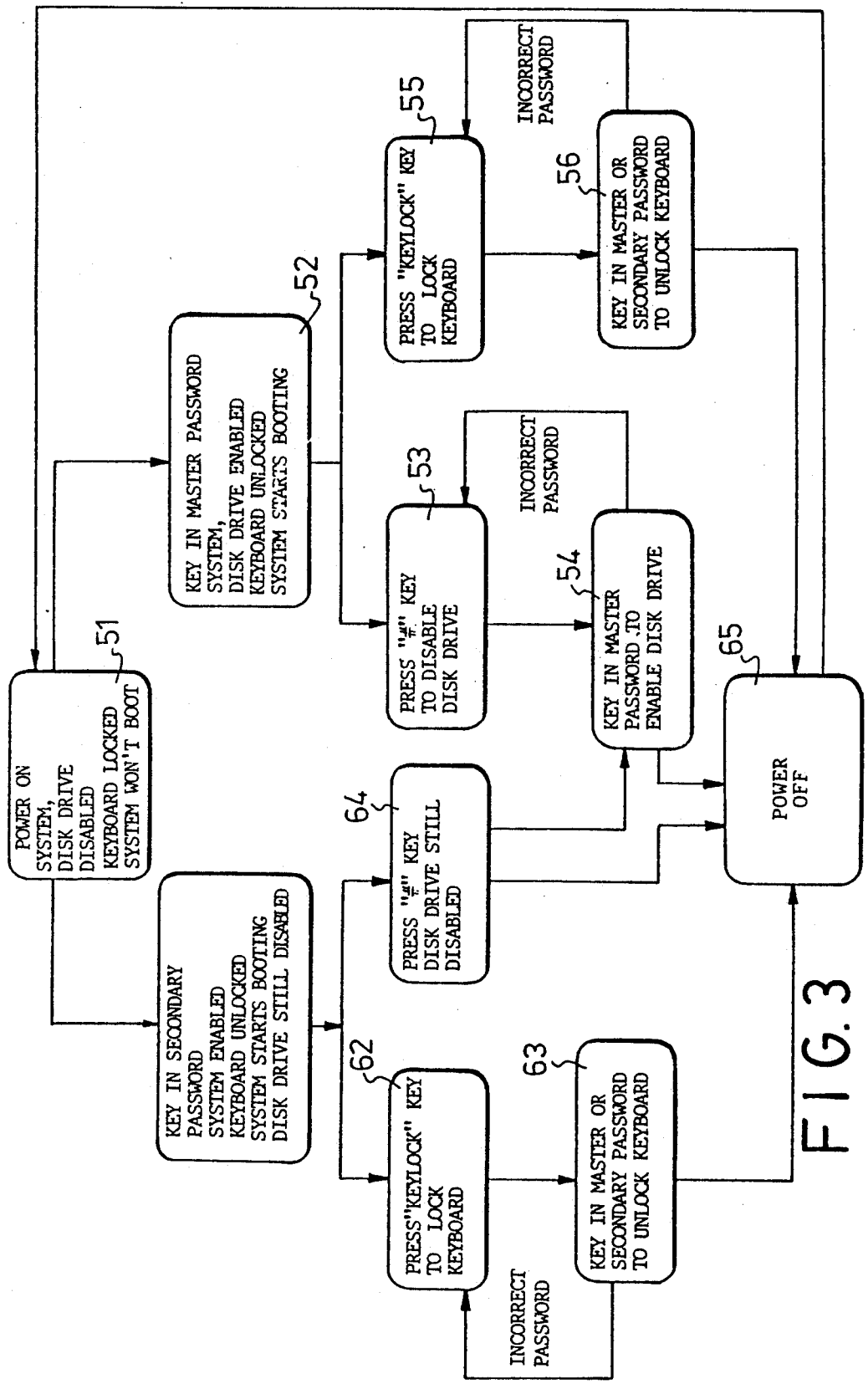
FIG. 3 is a flowchart illustrating the operation of the preferred embodiment.

FIG. 3 is a flowchart illustrating the operation of the computer (4) of the present invention. The computer keyboard (42), the floppy disk drive (41) and the main system board (44) are initially locked and disabled when the computer (4) is turned on (Step 51). The keypad (2) is operated so as to key in one of two types of passwords. A master password is keyed in so as to unlock the computer keyboard (42) and enable the floppy disk drive (41) and the main system board (44) (Step 52). A secondary password is keyed in so as to unlock the computer keyboard (42) and enable the main system board (44) (Step 61). The floppy disk drive (41), however, remains in a disabled state, thereby preventing data loss due to the carelessness of the user and further preventing the introduction of a computer virus into the computer (4).

The main system board (44) starts booting after the master password has been keyed in (Step 52). A "#" function key on the keypad (2) may be operated anytime during the normal operation of the computer (4) so as to disable the floppy disk drive (41) when it is necessary for the user to leave the computer (4) for a short period of time (Step 53). This obviates the need to turn off the computer (4) in order to prevent unauthorized use of the same, as is required in conventional control devices. Enabling of the floppy disk drive (41) can be accomplished by simply keying in the master password (Step 54). Note that the floppy disk drive (41) is not enabled if an incorrect master password is keyed in.

A "KEYLOCK" function key on the keypad (2) may also be operated anytime during the normal operation of the computer (4) so as to lock the computer keyboard (42) when it is necessary for the user to leave the computer (4) for a short period of time (Step 55). The computer keyboard (42) is unlocked by simply keying in the master password or the secondary password (Step 56). The computer keyboard (42) remains locked if an incorrect master or secondary password is keyed in.

The computer keyboard (42) is unlocked, and the main system board (44) similarly starts booting after the secondary password has been keyed in (Step 61). The floppy disk drive (41), however, remains disabled. Operation of the computer (4) is still possible if use of the disk drive (41) is not required.

The floppy disk drive (41) remains disabled when the "#" function key is operated after keying in the secondary password (Step 64). Enabling of the floppy disk drive (41) is accomplished by keying in the master password (Step 54).

The computer keyboard (42) can be locked anytime during the normal operation of the computer (4) when the "KEYLOCK" function key is operated (Step 62). The computer keyboard (42) is unlocked by simply keying in the master password or the secondary password (Step 63). The computer keyboard (42) remains locked if an incorrect master or secondary password is keyed in.

The computer (4) is turned off when use of the same has been completed (Step 65). The computer keyboard (42), the floppy disk drive (41) and the main system board (44) are again locked and disabled when the computer (4) is turned on (Step 51).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A computer having two disk drives receiving spaces, a floppy disk drive provided in one of said disk drive receiving spaces, a computer keyboard, a computer power supply, and a main system board with a clock generator circuit and a power on reset circuit, wherein the improvement comprises:

an access control device comprising: a casing having a front panel and a pair of side panels which cooperatively define a receiving space, said casing being received in the other one of said disk drive receiving spaces; a keypad provided on said front panel and operated so as to provide an input password; and a control unit provided in said receiving space of said casing and being electrically connected to said keypad; and said control unit comprising: a memory unit containing a desired password; a microprocessor unit receiving said input password from said keypad and generating an activating signal when said input password tallies with said desired password in said memory unit; and at least one control circuit connected to a respective one of said computer keyboard, said floppy disk drive and said main system board and being actuated by said activating signal from said microprocessor unit so as to unlock and enable the respective one of said computer keyboard, said floppy disk drive and said main system board.

2. The computer as claimed in claim 1, wherein said memory unit is an electronic erasable programmable read only memory unit.

3. The computer as claimed in claim 1, wherein said control circuit comprises a relay means actuated by said activating signal so as to connect said computer keyboard and said main system board in order to unlock said computer keyboard.

4. The computer as claimed in claim 1, wherein said control circuit comprises a relay means actuated by said activating signal so as to connect said floppy disk drive and said computer power supply in order to enable said floppy disk drive.

5. The computer as claimed in claim 1, wherein said control circuit comprises a relay means actuated by said activating signal so as to disconnect said clock generator circuit and said power on reset circuit in order to enable said main system board.

6. A computer having a first disk drive receiving space, a computer keyboard, a computer power supply, and a main system board with a clock generator circuit and a power on reset circuit, wherein the improvement comprises:

an access control device comprising: a casing having a front panel and a pair of side panels which cooperatively define a receiving space, said casing being received in said first disk drive receiving space; a keypad provided on said front panel and operated so as to provide an input password; and a control unit provided in said receiving space of said casing and being electrically connected to said keypad; and said control unit comprising: a memory unit containing a desired password; a microprocessor unit receiving said input password from said keypad and generating an activating signal when said input password tallies with said desired password in said memory unit; and at least one control circuit connected to a respective one of said computer keyboard and said main system board and being actuated by said activating signal from said microprocessor unit so as to unlock and enable the respective one of said computer keyboard and said main system board.

7. The computer as claimed in claim 6, wherein said memory unit is an electronic erasable programmable read only memory unit.

8. The computer as claimed in claim 6, wherein said control circuit comprises a relay means actuated by said activating signal so as to connect said computer keyboard and said main system board in order to unlock said computer keyboard.

9. The computer as claimed in claim 6, wherein said control circuit comprises a relay means actuated by said activating signal so as to disconnect said clock generator circuit and said power on reset circuit in order to enable said main system board.

10. The computer as claimed in claim 6, further comprising a second disk drive receiving space and a floppy disk drive provided in said second disk drive receiving space, said control unit further including a relay means actuated by said activating signal so as to connect said floppy disk drive and said computer power supply in order to enable said floppy disk drive.

* * * * *